(12) United States Patent
Kim et al.

(10) Patent No.: US 9,534,149 B2
(45) Date of Patent: Jan. 3, 2017

(54) ADHESIVE FILM AND TOUCH PANEL (75) Inventors: Jang-Soon Kim, Seongnam-si (KR);
Min-Seok Song, Anyang-si (KR);
Eok-Hyung Lee, Cheongju-si (KR);
Won-Gu Choi, Anyang-si (KR);
Jae-Gwan Lee, Daejeon (KR);
Yong-Hoon Lee, Cheongju-si (KR);
Hak-Rhim Han, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 13/510,066

(22) PCT Filed: Mar. 14, 2011

(86) PCT No.: PCT/KR2011/001773
§ 371 (c)(1),
(2), (4) Date: May 16, 2012

(87) PCT Pub. No.: WO2011/115399
PCT Pub. Date: Sep. 22, 2011

(65) Prior Publication Data
US 2012/0231245 A1    Sep. 13, 2012

(30) Foreign Application Priority Data
Mar. 16, 2010   (KR) .................. 10-2010-0023285

(51) Int. Cl.
*B32B 27/08*  (2006.01)
*C09J 4/00*   (2006.01)
(Continued)

(52) U.S. Cl.
CPC ............... *C09J 4/00* (2013.01); *C09J 133/06* (2013.01); *C09J 133/066* (2013.01);
(Continued)

(58) Field of Classification Search
None
See application file for complete search history.

(56) References Cited

U.S. PATENT DOCUMENTS

| 5,955,198 A | 9/1999 | Hashimoto et al. |
| 2003/0232192 A1 | 12/2003 | Kishioka et al. |

(Continued)

FOREIGN PATENT DOCUMENTS

| CN | 1166154 A | 11/1997 |
| CN | 1381752 A | 11/2002 |

(Continued)

OTHER PUBLICATIONS

International Search Report mailed Nov. 30, 2011 for PCT/KR2011/001773.

(Continued)

*Primary Examiner* — Ronak Patel
*Assistant Examiner* — Thomas Mangohig
(74) *Attorney, Agent, or Firm* — Hauptman Ham, LLP (57) ABSTRACT

The present invention relates to an adhesive film and to a touch panel. According to the present invention, even when the adhesive film is applied to a touch panel, for example, a capacitive touch panel, and directly attached to a conductive layer, the adhesive film effectively prevents the resistance of the conductive layer from being raised and exhibits good heat resistance. In addition, according to the present invention, an adhesive film having superior durability, optical characteristics, cuttability, workability, wettability and resistance to warping is provided.

6 Claims, 4 Drawing Sheets

(51) Int. Cl.
*C09J 133/06* (2006.01)
*G06F 1/16* (2006.01)
*C09J 183/00* (2006.01)
*C09J 183/04* (2006.01)
*B32B 7/02* (2006.01)
*C08G 77/12* (2006.01)
*C08G 77/20* (2006.01)

(52) U.S. Cl.
CPC ........... *C09J 183/00* (2013.01); *C09J 183/04* (2013.01); *G06F 1/16* (2013.01); *C08G 77/12* (2013.01); *C08G 77/20* (2013.01); *C09J 2201/36* (2013.01); *C09J 2203/318* (2013.01); *C09J 2433/00* (2013.01); *Y10T 428/24942* (2015.01); *Y10T 428/31797* (2015.04)

(56) References Cited

U.S. PATENT DOCUMENTS

| | | | |
|---|---|---|---|
| 2004/0191509 A1* | 9/2004 | Kishioka et al. | 428/354 |
| 2005/0202238 A1 | 9/2005 | Kishioka et al. | |
| 2006/0094834 A1* | 5/2006 | Aoki et al. | 525/478 |

FOREIGN PATENT DOCUMENTS

| | | | |
|---|---|---|---|
| CN | 1840599 A | 10/2006 | |
| EP | 1297489 | 9/2004 | |
| EP | 2341112 A1 | 7/2011 | |
| JP | 2003177241 A | 6/2003 | |
| JP | 2003238915 A | 8/2003 | |
| JP | 2004503028 A | 1/2004 | |
| JP | 2004231723 A | 8/2004 | |
| JP | 2005105228 A | 4/2005 | |
| JP | 2006045315 A | 2/2006 | |
| JP | 2008266473 A | 11/2008 | |
| JP | 2009-242786 A * | 10/2009 | ............ C09J 133/00 |
| JP | 2011057883 A | 3/2011 | |
| KR | 10-2010-0009574 | 1/2010 | |
| TW | 200716715 A | 5/2007 | |
| TW | 200745924 A | 12/2007 | |
| WO | 2010044229 A1 | 4/2010 | |
| WO | 2010137523 A1 | 12/2010 | |

OTHER PUBLICATIONS

Chinese Office Action mailed on Sep. 12, 2013.
Taiwanese Office Action mailed on Oct. 3, 2013.
Japanese Office Action mailed on Oct. 17, 2013.
Japanese Office Action dated Sep. 11, 2014.
European Search Report dated Jun. 8, 2015 in connection with the counterpart European Patent Application No. 11756530.9.

* cited by examiner

ADHESIVE FILM AND TOUCH PANEL

CROSS REFERENCE TO RELATED APPLICATION

This application claims the priority of Korean Patent Application No. 10-2010-0023285, filed on Mar. 16, 2010 in the KIPO (Korean Intellectual Property Office). Further, this application is the National Phase application of International Application No. PCT/KR2011/001773 filed Mar. 14, 2011, which designates the United States and was published in Korean.

TECHNICAL FIELD

The present invention relates to an adhesive film and a touch panel.

BACKGROUND ART

Recently, a market for mobile communication devices, such as mobile phones, PHSs and PDAs, has been growing. Such mobile communication devices are moving towards slimness, lightness, low-power consumption, high resolution, and high brightness.

In particular, a device equipped with a touch panel or touchscreen as an input device has a structure in which a transparent conductive plastic film, for example, a polyethylene terephthalate (PET) base film having a conductive thin layer of an ITO formed on one side thereof, is stacked on conductive glass, a reinforcing material, or a decoration film through an adhesive film in consideration of lightness and breakage prevention.

Adhesives used for attaching a transparent conductive film in a touchscreen or touch panel need to have various physical properties, such as uneven surface leveling performance for relieving an uneven surface due to a decoration film, durability for controlling generation of curls or bubbles when exposed to severe conditions, for example, high temperature or high humidity, cuttability for preventing the adhesives from sticking out or being squashed when cut, and excellent adhesion to various substrates as well as optical characteristics, workability, and resistance to warping.

Particularly, a capacitive touch panel is designed to have a structure such that an adhesive film is directly attached to a conductive layer (for example, ITO). Thus, an adhesive layer employed for the capacitive touch panel needs to suppress a change in resistance of a transparent electrode formed of, for example, ITO.

A touchscreen or touch panel may be exposed to various environments during manufacture, storage, transport, and sale. Specifically, when the touchscreen or touch panel is exposed to severe conditions, for example, high temperature and high humidity, a substantial change in resistance can occur in an electrode of the screen or panel, causing serious damage or product defects.

One approach to solve such problems is addition of a tackifier or plasticizer to the adhesives. However, when a tackifier is added to the adhesives, modulus of the adhesives at low temperature increases, while durability at high temperature decreases. Also, when a plasticizer is added, modulus of the adhesives can decrease, whereas poor compatibility of the plasticizer with the adhesives can deteriorate reliability over time.

DISCLOSURE

Technical Problem

The present invention is directed to providing an adhesive film and a touch panel.

Technical Solution

One aspect of the present invention provides an adhesive film including a first adhesive layer having a first surface and a second surface; and a second adhesive layer having a first surface and a second surface, and satisfying Equation 1:

$$\Delta R = \frac{R_f - R_i}{R_i} \times 100 \leq 50$$

where $R_i$ is initial resistance of an ITO layer in a sample prepared by cutting the adhesive film into a 4 cm×3 cm size and attaching the first surface of the first adhesive layer to an ITO side of a plastic film having an ITO layer formed on one side thereof and $R_1$ is resistance of the ITO layer measured after the sample was left at 60° C. and 90% RH for 10 days.

Another aspect of the present invention provides a touch panel, which includes a conductive plastic film having a conductive layer formed on one side thereof; and the adhesive film according to the present invention attached to the conductive layer of the conductive plastic film, wherein the first surface of the first adhesive layer of the adhesive film is attached to the conductive layer of the conductive plastic film.

Advantageous Effects

According to embodiments of the present invention, even when the adhesive film is applied to a touch panel, for example, a capacitive touch panel, and directly attached to a conductive layer, the adhesive film effectively prevents resistance of the conductive layer from increasing and exhibits good heat resistance. In addition, according to the present invention, the adhesive film has good durability, optical characteristics, cuttability, workability, wettability, and resistance to warping.

BEST MODE

The present invention relates to an adhesive film including a first adhesive layer having a first surface and a second surface; and a second adhesive layer having a first surface and a second surface, and satisfying Equation 1:

$$\Delta R = \frac{R_f - R_i}{R_i} \times 100 \le 50,$$

where $R_i$ is initial resistance of an ITO layer in a sample prepared by cutting the adhesive film into a 4 cm×3 cm size and attaching the first surface of the first adhesive layer to an ITO side of a plastic film having an ITO layer formed on one side thereof, and $R_1$ is resistance of the ITO layer measured after the sample was left at 60° C. and 90% RH for 10 days.

Next, the adhesive film according to the present invention will be described in detail.

The adhesive film according to the present invention may effectively suppresses an increase in resistance of an ITO layer after being attached to a transparent electrode layer, such as an ITO layer, and left under severe conditions. In detail, the adhesive film according to the present invention has a resistance variation rate ($\Delta R$) of 50 or less (that is, a resistance increase rate of 150% or less), preferably less than 20 (that is, a resistance increase rate of less than 120%), and more preferably 10 or less (that is, a resistance increase rate of 110% or less), as obtained by measuring a resistance increase rate by Equation 1. In the present invention, the resistance variation rate ($\Delta R$) is adjusted to 50 or less to suppress a change in resistance of a transparent electrode of a touch panel, for example, when the adhesive film is applied to the touch panel or a touchscreen and exposed to various environments during manufacture, storage, transport, and sale, thereby stably maintaining product quality.

In the present invention, the resistance variation rate ($\Delta R$) may be measured by Equation 1 as follows. The adhesive film, particularly the first surface of the first adhesive layer, is attached to the ITO side to prepare a sample, immediately after which initial resistance of the ITO ($R_i$) of the sample is measured. Then, the sample is left at 60° C. and 90% RH for 10 days, followed by measuring the resistance of the ITO ($R_1$).

Figure 1:
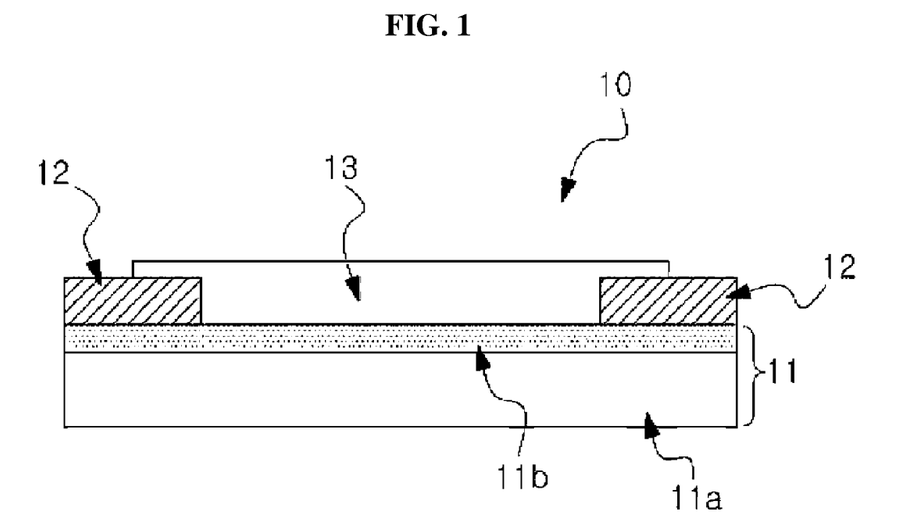
FIG. 1 is a side-sectional view of a sample for measuring a resistance increase rate in which an adhesive film is attached to an ITO conductive film according to the present invention.
Figure 2:
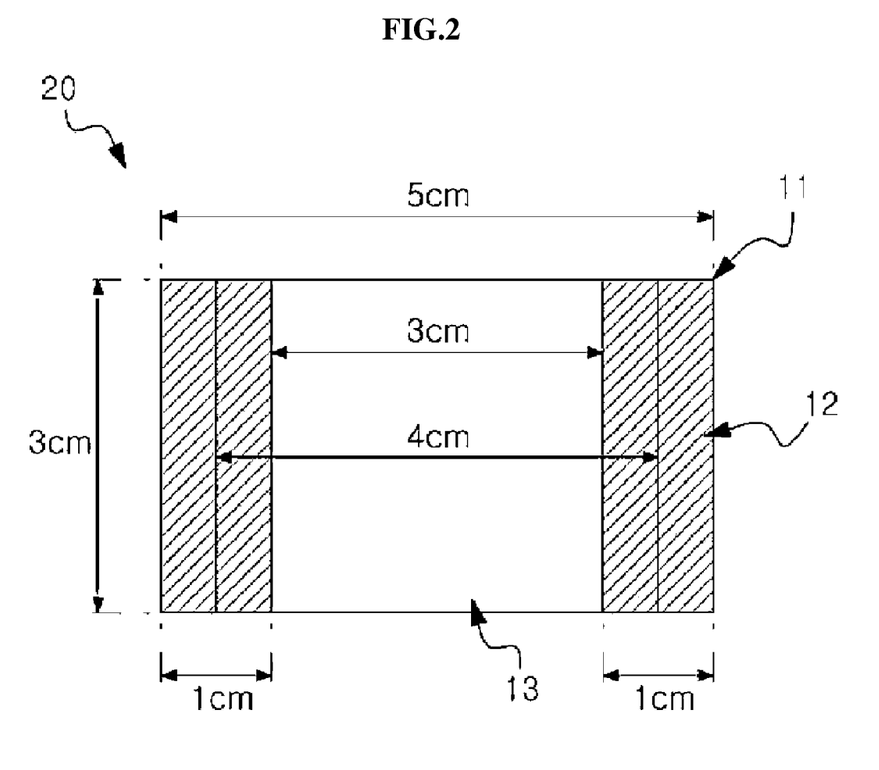
FIG. 2 is a front view of the sample for measuring the resistance increase rate in which the adhesive film is attached to the ITO conductive film according to the present invention.

FIGS. 1 and 2 illustrate samples 10, 20 used for measuring a resistance variation rate ($\Delta R$) in the adhesive film 13 according to the present invention.

As shown in FIG. 1, to measure a resistance variation rate ($\Delta R$), the adhesive film 13 is cut into a 4 cm×3 cm (width× length) piece. Then, the cut adhesive film 13 is attached to a 5 cm×3 cm (width×length) conductive film 11 which includes an ITO layer 11b formed on one surface thereof and 1 cm-wide silver electrodes 12 formed at opposite edges. In this case, the conductive film includes a polyethylene terephthalate (PET) base 11a and the ITO layer 11b formed on one surface of the base 11a, and the adhesive film 13 is attached to the conductive film such that the first surface of the first adhesive layer is in contact with the ITO layer 11b. In manufacturing the samples 10, 20, the adhesive film 13 is attached to the ITO layer 11b, with each opposite edge portion covering half of each silver electrode 12, as shown in FIGS. 1 and 2. In the present invention, after manufacturing the samples 10, 20, initial and later resistances of the ITO layer 11b are measured by a resistance tester to calculate the resistance variation rate ($\Delta R$).

In the present invention, there is no particular restriction as to a lower limit of a resistance variation rate ($\Delta R$). That is, as the resistance variation rate has a lower value, the adhesive film provides remarkable effects when applied to a touch panel or touchscreen.

Figure 3:
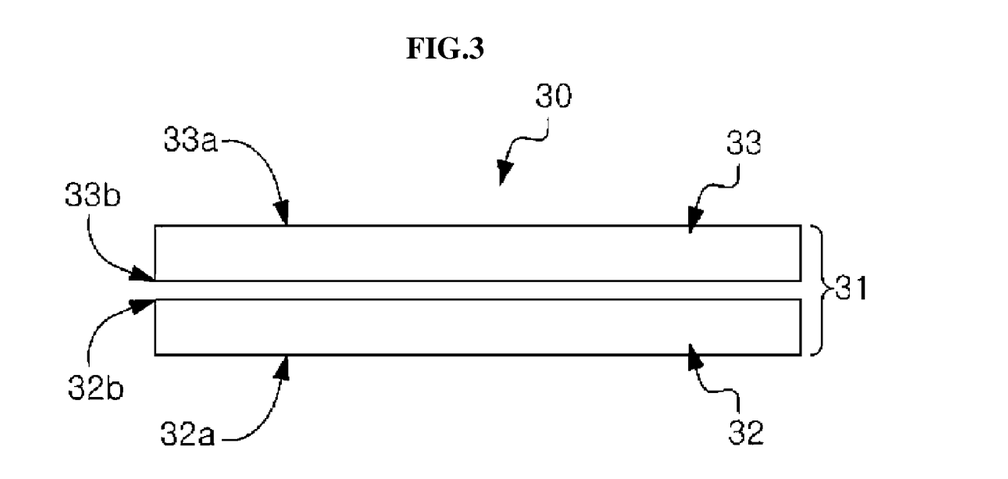
FIG. 3 is a side-sectional view of an adhesive film according to one embodiment of the present invention.

FIG. 3 is a side-sectional view of an adhesive film 30 according to one embodiment of the present invention. As shown in FIG. 3, the adhesive film 30 includes a first adhesive layer 32 and a second adhesive layer 33, wherein the first and second adhesive layers 32, 33 includes first surfaces 32a, 33a and second surfaces 32b, 33b.

According to the embodiment, in the adhesive film 30 of FIG. 3, the second surface 33b of the second adhesive layer 33 may be in direct contact with the second surface 32b of the first adhesive layer 32, respectively.

When applying the adhesive film of the present invention to a touch panel or touchscreen, the first surface of the first adhesive layer is attached to a transparent electrode layer. In the present invention, the composition of the first adhesive layer is not particularly limited so long as the first adhesive layer satisfies Equation 1. However, to effectively satisfy Equation 1, a resin forming the first adhesive layer may not contain a carboxyl group as a cross-linking functional group. For example, when the adhesive layer is composed of an acrylic resin, a monomer having a carboxyl group, such as acrylic acid, may not be used as a monomer for forming the acrylic resin. A carboxyl group is a functional group which can impart a high glass transition temperature and adhesion to adhesives and thus is commonly used for adhesives. However, the inventors of the present invention found out that when an adhesive composition contains a resin having a carboxyl group and adhesives formed of this composition is applied to a touch panel, the adhesives have remarkably poor effect in suppressing a resistance change of a transparent electrode.

In the present invention, the first adhesive layer may include, for example, a cured product of an adhesive composition containing an acrylic resin and a multifunctional cross-linker or a cured product of a silicone adhesive composition.

In the present invention, when the first adhesive layer includes the cured product of the adhesive composition containing the acrylic resin and the multifunctional cross-linker (hereinafter, also referred to as an "acrylic adhesive composition"), the acrylic resin may include, for example, a polymer of a monomer mixture including a (meth)acrylic acid ester monomer and a cross-linking monomer. In this case, the cross-linking monomer may be a cross-linking monomer composed of a hydroxyl group containing monomer.

Herein, the term "cross-linking monomer composed of a hydroxyl group containing monomer" means that a cross-linking monomer included in a monomer mixture includes a hydroxyl group containing monomer only among cross-linking monomers generally used for adhesives. That is, a carboxyl group containing monomer or a nitrogen containing monomer as a cross-linking monomer is excluded from the scope of the term. As described above, when the monomer mixture includes a carboxyl group containing monomer, the adhesives may have low effect in suppressing a resistance change of a transparent electrode.

In the present invention, there is no particular restriction as to the kind of (meth)acrylic acid ester monomer, which may include, for example, alkyl (meth)acrylate. In this case, when a too long alkyl group is included in the monomer, cohesiveness of the cured product may decrease and the glass transition temperature or tack of the cured product may not be suitably adjusted. Thus, alkyl (meth)acrylate having a C1 to C14, preferably C1 to C8 alkyl group are used. Examples of such monomers may include methyl (meth) acrylate, ethyl (meth)acrylate, n-propyl (meth)acrylate, iso-propyl (meth)acrylate, n-butyl (meth)acrylate, t-butyl (meth)

acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, and isononyl methacrylate, which may be used alone or as mixtures.

In the present invention, the (meth)acrylic acid ester monomer included in the monomer mixture may at least partly include hydrophobic monomers. The hydrophobic monomers increase wettability of the adhesives to improve durability as well as enhance moisture resistance to redouble effects of suppressing a resistance change of the transparent electrode. Generally, hydrophobicity or hydrophilicity of a monomer is related to polarity of the monomer. For example, if a monomer has high polarity, it has a strong affinity with a polar solvent such as water or alcohol and thus is classified as a hydrophilic monomer. On the contrary, if a monomer is nonpolar, it has a remarkably low affinity with a hydrophilic solvent and thus is classified as a hydrophobic monomer. Generally, a monomer containing an oxygen or nitrogen atom induces non-uniform distribution of electrons existing in the monomer, and the monomer is classified as a hydrophilic monomer. In this respect, the (meth)acrylic acid ester monomer is generally polar due to an ester bond or carbon-carbon double bond and thus is hydrophilic. However, by suitably controlling a backbone of the (meth)acrylic acid ester monomer, the polarity of the monomer may be effectively offset, and accordingly the monomer may function as a hydrophobic monomer which is nonpolar overall. Thus, hydrophobic monomers available in the present invention include alkyl (meth)acrylates having C4 to C20, preferably C4 to C16 alkyl groups. Such monomers are nonpolar due to characteristics of an alkyl group forming a backbone and have high resistance to polar materials (for example, water). Accordingly, polymers of these monomers may impart excellent moisture resistance to adhesives. Moreover, the hydrophobic monomers exhibit excellent resistance to UV or thermal deterioration, thereby remarkably improving durability of the adhesives according to the present invention. Examples of such hydrophobic monomers include at least one selected from the group consisting of octyl (meth) acrylate, 4-methyl-2-pentyl (meth)acrylate, 2-methylbutyl (meth)acrylate, isoamyl (meth)acrylate, sec-butyl (meth) acrylate, n-butyl(meth)acrylate, ethylhexyl (meth)acrylate, decyl (meth)acrylate, isononyl(meth)acrylate, stearyl (meth) acrylate, lauryl (meth)acrylate, isotridecyl (meth)acrylate, cyclohexyl (meth)acrylate, and isobornyl (meth)acrylate; preferably at least one selected from the group consisting of ethylhexyl (meth)acrylate, cyclohexyl (meth)acrylate, isobornyl (meth)acrylate, lauryl (meth)acrylate, and stearyl (meth)acrylate.

In the present invention, there is no particular restriction as to a ratio of the hydrophobic monomer included in the (meth)acrylic acid ester monomer. That is, the (meth)acrylic acid ester monomer may entirely include the hydrophobic monomer or partly include the hydrophobic monomer as needed. If the (meth)acrylic acid ester monomer partly includes the hydrophobic monomer, the amount of the hydrophobic monomer is not particularly limited but may be suitably controlled in consideration of desired effect of improving moisture resistance of the adhesives.

In the present invention, the cross-linking monomer included in the monomer mixture means a monomer including both a polymerizable functional group (for example, carbon-carbon double bond) and a cross-linking functional group in a molecular structure. As described above, in the first adhesive layer, the cross-linking monomer may include only a hydroxyl group containing monomer which has a hydroxyl group as a cross-linking functional group. In this case, examples of the hydroxyl group containing monomer may include, without being particularly limited, at least one selected from the group consisting of 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth) acrylate, and 2-hydroxypropylene glycol (meth)acrylate.

The monomer mixture includes 80 to 99.9 parts by weight of the (meth)acrylic acid ester monomer and 0.1 to 10 parts by weight of the cross-linking monomer, preferably 90 to 99.9 parts by weight of the (meth)acrylic acid ester monomer and 0.1 to 10 parts by weight of the cross-linking monomer. If the amount of the (meth)acrylic acid ester monomer is less than 80 parts by weight in the monomer mixture, initial adhesive strength of the adhesives can be decreased. If the amount of the (meth)acrylic acid ester monomer is greater than 99.9 parts by weight, cohesiveness of the adhesives can decrease, causing a durability problem. Further, the amount of the cross-linking monomer is less than 0.1 parts by weight in the monomer mixture, physical properties of cured products, such as durability, can be deteriorated. If the amount of the cross-linking monomer is greater than 10 parts by weight, surface migration can occur, or peeling or separation of the adhesive film can happen due to decrease in fluidity or increase in cohesiveness.

Unless otherwise indicated in the specification, "part by weight" denotes "ratio by weight."

In the present invention, there is no particular restriction as to a method of manufacturing an acrylic resin by polymerization of the monomer mixture including the aforementioned components. For example, a general polymerization method, such as solution polymerization, photo-polymerization, bulk polymerization, suspension polymerization, or emulsion polymerization, may be used.

In the present invention, the acrylic adhesive composition forming the first adhesive layer may include a multifunctional cross-linker together with the acrylic resin.

The multifunctional cross-linker used in the present invention may include, without being particularly limited, for example, generally used crosslinkers, such as isocyanate compounds, epoxy compounds, aziridine compounds, and metal chelating agents. Among these, an isocyanate compound may be used, without being limited thereto. Examples of the isocyanate compounds may include tolylene diisocyanate, xylene diisocyanate, diphenylmethane diisocyanate, hexamethylene diisocyanate, isophorone diisocyanate, tetramethylxylene diisocyanate, naphthalene diisocyanate, and adducts of these isocyanate compounds and a polyol (for example, trimethylolpropane). Examples of the epoxy compounds may include at least one selected from the group consisting of ethylene glycol diglycidyl ether, triglycidyl ether, trimethylolpropane triglycidyl ether, N,N,N',N'-tetraglycidyl ethylene diamine, and glycerin diglycidyl ether. Examples of the aziridine compounds may include at least one selected from the group consisting of N,N'-toluene-2,4-bis(1-aziridinecarboxamide), N,N'-diphenylmethane-4,4'-bis(1-aziridinecarboxamide), triethylenemelamine, bisisophthaloyl-1-(2-methylaziridine), and tri-1-aziridinylphosphine oxide. Examples of the metal chelating agents may include compounds obtained by coordinating acetylacetone or ethyl acetoacetate with at least one polyvalent metal, such as aluminum, iron, zinc, tin, titanium, antimony, magnesium, and vanadium, without being limited thereto.

In the acrylic adhesive composition, the multifunctional cross-linker is present in an amount of 0.01 to 10 parts by weight, preferably 0.01 to 5 parts by weight based on 100 parts by weight of the acrylic resin. If the amount of the multifunctional cross-linker is less than 0.01 parts by weight, cohesiveness of the cured product can be decreased. If the amount of the multifunctional cross-linker is greater than 10 parts by weight, peeling or separation between layers of the film may occur, reducing durability.

In the present invention, the acrylic adhesive composition forming the first adhesive layer may further include a silane coupling agent as needed. The coupling agent enhances adhesion and adhesive stability of the film to an adherend, thus improving heat resistance and moisture resistance. Further, a suitable amount of the coupling agent may improve adhesive reliability of the film at high temperature and humidity.

Examples of the silane coupling agent used in the present invention may include γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltrimethoxysilane, γ-aminopropyltriethoxysilane, 3-isocyanatopropyltriethoxysilane, or γ-acetoacetatetripropyltrimethoxysilane, which may be used alone or as mixtures, without being limited thereto.

When the adhesive composition includes the silane coupling agent, the silane coupling agent may be present in an amount of 0.005 to 5 parts by weight based on 100 parts by weight of the acrylic resin. If the amount of the silane coupling agent is less than 0.005 parts by weight, the coupling agent may not effectively work. If the amount of the coupling agent is greater than 5 parts by weight, bubbles or peeling of the film may occur, reducing durability.

In the present invention, the acrylic adhesive composition forming the first adhesive layer may further include a tackifier resin as needed.

Examples of the tackifier resin may include hydrocarbon resins or hydrogenated products thereof; rosin or hydrogenated products thereof; rosin ester resins or hydrogenated products thereof; terpene resins or hydrogenated products thereof; terpene phenolic resins or hydrogenated products thereof; and polymerized rosin resins or polymerized rosin ester resins, which may be used alone or as mixtures, without being limited thereto.

When the adhesive composition includes a tackifier resin, the tackifier resin may be present in an amount of 1 to 100 parts by weight based on 100 parts by weight of the acrylic resin. If the amount of tackifier resin is less than 1 part by weight, the tackifier resin does not effectively work. If the amount of the tackifier resin is greater than 100 parts by weight, compatibility or cohesiveness improving effect of the tackifier can be deteriorated.

The acrylic adhesive composition forming the first adhesive layer may further include at least one kind of additives selected from the group consisting of epoxy resins, cross-linkers, UV stabilizers, antioxidants, toning agents, reinforcing agents, fillers, antifoaming agents, surfactants, and plasticizers so long as it does not affect aspects of the present invention.

In the present invention, the first adhesive layer may include a cured product of a silicone adhesive composition as needed. In this case, there is no particular restriction as to the kind of used silicone adhesive compositions, which may be a heat-curable composition or a UV-curable composition.

In one embodiment of the present invention, the heat-curable silicone composition may include compositions cured by hydrosilylation; compositions cured by condensation of silanol; alcohol-elimination, oxime-elimination, or acetic acid-elimination silicone compositions, without being limited thereto. Further, examples of the UV-curable silicone composition may include (meth)acrylic functional silicone (for example, a silicone compound disclosed in Japanese Patent Publication No. H01-304108), silicone having a vinyl group and a mercapto group (for example, silicone compounds disclosed in JP Patent Publication No. S53-37376), an epoxy-functional silicone (for example, silicone compounds disclosed in Japanese Patent Publication No. S58-174418, a vinyl ether-functional silicone (for example, a silicone compound disclosed in U.S. Pat. No. 4,617,238, Crivello, J. V., Eckberg, R. P.), a composition containing silanol-functional silicone(poly(silsesquioxane)) or poly(silsesquioxane) and tetraphenoxysilane (for example, JP Patent Publication No. H06-148887) or a curable composition containing a siloxane polymer and a base generating material (e.g, a silicone compound disclosed in JP Patent Publication No. H06-273936 and No. H07-69610), without being limited thereto.

In one embodiment of the present invention, the silicone adhesive composition may include addition-curable silicone compositions, specifically a composition including (i) organopolysiloxane having at least two alkenyl groups per molecule, (ii) organopolysiloxane having at least two silicon-linked hydrogen atoms per molecule, and (iii) a platinum curing catalyst.

In the addition-curable silicone composition, the organopolysiloxane (i) is a main component forming a silicone cured product and includes at least two alkenyl groups in one molecule. Here, examples of the alkenyl groups may include a vinyl group, an allyl group, a butenyl group, a pentenyl group, a hexenyl group, or a heptenyl group. Among these, a vinyl group may be used, without being limited thereto. In the organopolysiloxane (i), the alkenyl groups may be linked to any position. For example, the alkenyl groups may be linked to a terminal and/or a side chain of the molecular chain.

Further, in the organopolysiloxane (i), substituents to be contained other than the alkenyl groups may include alkyl groups, such as a methyl group, an ethyl group, a propyl group, a butyl group, a pentyl group, a hexyl group, or a heptyl group; aryl groups, such as a phenyl group, a tolyl group, a xylyl group, or a naphthyl group; aralkyl groups, such as a benzyl group or a penentyl group; and halogenated alkyl groups, such as a chloromethyl group, a 3-chloropropyl group, or a 3,3,3-trifluoropropyl group.

In the present invention, the organopolysiloxane (i) may have, for example, any molecular structure, such as a straight chain, a branched chain, a ring structure, a network structure, and a straight chain having a branched side chain. Among these structures, the organopolysiloxane (i) may have a straight chain structure, without being limited thereto.

Examples of the organopolysiloxane (i) used in the present invention may include a copolymer of dimethylsiloxane and methylvinylsiloxane with both molecular chain terminals blocked with trimethylsiloxane groups, polymethylvinylsiloxane with both molecular chain terminals blocked with trimethylsiloxane groups, a copolymer of dimethylsiloxane, methylvinylsiloxane and methylphenylsiloxane with both molecular chain terminals blocked with trimethylsiloxane groups, polydimethylsiloxane with both molecular chain terminals blocked with dimethylvinylsiloxane groups, polymethylvinylsiloxane with both molecular chain terminals blocked with dimethylvinylsiloxane groups, a copolymer of dimethylsiloxane and methylvinylsiloxane with both molecular chain terminals blocked with dimethylvinylsiloxane groups, a copolymer of dimethylsiloxane, methylvinylsiloxane and methylphenylsiloxane with both molecular chain terminals blocked with dimethylvinylsiloxane groups, an organopolysiloxane copolymer including a siloxane unit represented by $R^1_2SiO_{1/2}$, a siloxane unit represented by $R^1_2R^2SiO_{1/2}$ and a siloxane unit represented by $SiO_{4/2}$, an organopolysiloxane copolymer including a siloxane unit represented by $R^1_2R^2SiO_{1/2}$ and a siloxane unit represented by $SiO_{4/2}$, an organopolysiloxane copolymer including a siloxane unit represented by $R^1R^2SiO_{2/2}$, a siloxane unit represented by $R^1SiO_{3/2}$ or a siloxane unit represented by $R^2SiO_{3/2}$, and mixtures thereof, without being limited.

Here, $R^1$ is a hydrocarbon group other than an alkenyl group, specifically alkyl groups, such as a methyl group, an ethyl group, a propyl group, a butyl group, a pentyl group, a hexyl group, or a heptyl group; aryl groups, such as a phenyl group, a tolyl group, a xylyl group, or a naphthyl group; aralkyl groups, such as a benzyl group or a penentyl group; and halogenated alkyl groups, such as a chloromethyl group, a 3-chloropropyl group, or a 3,3,3-trifluoropropyl group. Further, $R^2$ is an alkenyl group, specifically a vinyl group, an allyl group, a butenyl group, a pentenyl group, a hexenyl group, or a heptenyl group.

In the addition-curable silicone composition, the organopolysiloxane (ii) may function to cross-link the organopolysiloxane (i). In the organopolysiloxane (ii), the hydrogen atoms may be linked to any position. For example, the hydrogen atoms may be linked to a terminal and/or a side chain of the molecular chain. Further, in the organopolysiloxane (ii), substituents to be contained other than the two hydrogen atoms linked to the silicon atom may include, without being particularly limited, for example, alkyl groups, aryl groups, aralkyl groups, or halogenated alkyl groups, as described above in the organopolysiloxane (i).

Like the organopolysiloxane (i), the organopolysiloxane (ii) may have any molecular structure, such as a straight chain, a branched chain, a ring structure, a network structure, and a straight chain having a branched side chain. Among these structures, the organopolysiloxane (ii) may have a straight chain structure, without being limited thereto.

Examples of the organopolysiloxane (ii) used in the present invention may include polymethylhydrogensiloxane with both molecular chain terminals blocked with trimethylsiloxane groups, a copolymer of dimethylsiloxane and methylhydrogen with both molecular chain terminals blocked with trimethylsiloxane groups, a copolymer of dimethylsiloxane, methylhydrogensiloxane and methylphenylsiloxane with both molecular chain terminals blocked with trimethylsiloxane groups, polydimethylsiloxane with both molecular chain terminals blocked with dimethylhydrogensiloxane groups, a copolymer of dimethylsiloxane and methylphenylsiloxane with both molecular chain terminals blocked with dimethylhydrogensiloxane groups, polymethylphenylsiloxane with both molecular chain terminals blocked with dimethylhydrogensiloxane groups, an organopolysiloxane copolymer including a siloxane unit represented by $R^1_3SiO_{1/2}$, a siloxane unit represented by $R^1_2HSiO_{1/2}$ n and a siloxane unit represented by $SiO_{4/2}$, an organopolysiloxane copolymer including a siloxane unit represented by $R^1_2HSiO_{1/2}$ and a siloxane unit represented by $SiO_{4/2}$, an organopolysiloxane copolymer including a siloxane unit represented by $R^1HSiO_{2/2}$, a siloxane unit represented by $R^1SiO_{3/2}$ or a siloxane unit represented by $HSiO_{3/2}$, and mixtures thereof, without being limited thereto. Here, $R^1$ is a hydrocarbon group other than an alkenyl group, specifically alkyl groups, such as a methyl group, an ethyl group, a propyl group, a butyl group, a pentyl group, a hexyl group, or a heptyl group; aryl groups, such as a phenyl group, a tolyl group, a xylyl group, or a naphthyl group; aralkyl groups, such as a benzyl group or a penentyl group; and halogenated alkyl groups, such as a chloromethyl group, a 3-chloropropyl group, or a 3,3,3-trifluoropropyl group.

In one embodiment, the amount of the organopolysiloxane (ii) is not particularly limited so long as suitable curing is carried out. For example, the organopolysiloxane (ii) may be added in an amount such that 0.5 to 10 silicon-linked hydrocarbon atoms are present per alkenyl group included in the organopolysiloxane (i). If the number of silicon-linked hydrocarbon atoms is less than 0.5, the curing silicone compound cannot be sufficiently cured. If the number of silicon-linked hydrocarbon atoms is greater than 10, the heat resistance of the cured product can be decreased.

In the addition-curable silicone composition, the platinum curing catalyst (iii) may include, for example, platinum fine powder, platinum black, platinum-carrying silica fine powder, platinum-carrying activated carbon, chloroplatinic acid, platinum tetrachloride, an alcoholic solution of chloroplatinic acid, a platinum-olefin complex, a complex of platinum and alkenylsiloxane such as 1,1,1,3,3-tetramethyl-1,3-divinyldisiloxane, and fine thermoplastic resin powder containing platinum or a platinum compound and having a particle diameter of less than 10 μm (polystyrene resin, nylon resin, polycarbonate resin, silicone resin, etc.), without being limited thereto.

There is no particular restriction as to the amount of the catalyst in the addition-curable silicone composition. For example, the catalyst is present in an amount of 0.1 to 500 ppm, preferably 1 to 50 ppm in terms of a unit by weight in the entire addition-curable silicone composition. If the amount of the catalyst is less than 0.1 ppm, the curing properties of the composition can be decreased. If the amount of the catalyst is greater than 500 ppm, cost efficiency can be reduced.

In one embodiment, the addition-curable silicone composition may further include a curing inhibitor in view of improvement in storage stability, handling, and workability. Examples of the curing inhibitor may include alkyne alcohols, such as 3-methyl-1-butyn-3-ol, 3,5-dimethyl-1-hexyn-3-ol, and phenyl butynol; enyne compounds, such as 3-methyl-3-penten-1-yne and 3,5-dimethyl-3-hexen-1-yne; 1,2,5,7-teramethyl-1,3,5,7-tetravinyl cyclotetrasiloxane, 1,3,5,7-tetramethyl-1,3,5,7-tetrahexenyl cyclotetrasiloxane, and benzotriazole. The amount of the curing inhibitor may be suitably adjusted so long as it does not affect aspects of the present invention. For example, the curing inhibitor may be added in an amount of 10 to 50,000 ppm in terms of a unit by weight.

The thickness of the first adhesive layer including the foregoing components is not particularly limited but is, for example, about 1 to 50 μm, preferably 1 to 30 μm, and more preferably 1 to 10 μm. In the present invention, the thickness of the first adhesive layer is in the range of 1 to 50 μm, so that a touch panel or screen is made slim as well as the adhesives exhibit excellent physical properties including heat resistance and resistance change control property.

The adhesive film according to the present invention includes a second adhesive layer together with the first adhesive layer. The second adhesive layer includes a first surface and a second surface in the same way as the first adhesive layer. As needed, the second surface of the second adhesive layer may be directly attached to the second surface of the first adhesive layer.

In the present invention, there is no particular restriction as to materials of the second adhesive layer. For example, the second adhesive layer may include a cured product of an acrylic adhesive composition containing an acrylic resin and a multifunctional cross-linker.

In this case, the acrylic resin may include a polymer of a monomer mixture including a (meth)acrylic acid ester monomer and a cross-linking monomer in the same manner as in the first adhesive layer. Available examples of the (meth)acrylic acid ester monomer and the cross-linking monomer are not particularly limited as to kind and amount but may be suitably selected from the scope described above in the first adhesive layer.

Further, in the second adhesive layer, the monomer mixture may include other cross-linking monomers in addition to a hydroxyl group containing monomer. For example, the cross-linking monomer may include not only a hydroxyl group containing monomer but also a carboxyl group containing monomer or a nitrogen containing monomer. Examples of the carboxyl group containing monomer may include (meth)acrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, or maleic anhydride, without being limited thereto. Examples of the nitrogen containing monomer may include 2-isocyanatoethyl (meth)acrylate, 3-isocyanatopropyl (meth)acrylate, 4-isocyanatobutyl (meth)acrylate, (meth)acryl amide, N-vinylpyrrolidone, or N-vinylcaprolactam, without being limited thereto.

Further, there is no particular restriction as to the kind and amount of the multifunctional cross-linker included in the acrylic adhesive composition forming the second adhesive layer. For example, the multifunctional cross-linker may be suitably selected from the scope described above in the first adhesive layer.

The adhesive composition forming the second adhesive layer may further include at least one kind of additives selected from the group consisting of silane coupling agents, tackifier resins, epoxy resins, UV stabilizers, antioxidants, toning agents, reinforcing agents, fillers, antifoaming agents, surfactants, and plasticizers in the same way as the acrylic adhesive composition forming the first adhesive layer.

The thickness of the second adhesive layer including the foregoing components is not particularly limited but is, for example 10 to 250 μm, preferably 25 to 250 μm. In the present invention, the thickness of the second adhesive layer is controlled within a range of 10 to 250 μm, so that a touch panel or touchscreen is made slim as well as the adhesive exhibits excellent physical properties including heat resistance.

There is no particular restriction as to a method of manufacturing the first and second adhesive layers by curing the adhesive compositions. In the present invention, for example, each adhesive composition or a coating solution prepared using the same is applied to a suitable substrate using a general instrument, such as a bar coater, followed by curing, thereby preparing an adhesive layer. In the present invention, the curing may be carried out after thoroughly removing volatile components contained in the adhesive composition or coating solution or reaction residues which can cause bubbles. Accordingly, it is prevented that the elastic modulus of the adhesive decreases due to excessively low crosslinking density or molecular weight and bubbles existing on the interface between the adhesive film and an adherend expand at high temperature to form scatterers.

Further, there is no particular restriction as to a method of curing the adhesive composition or coating solution. For example, the curing may be conducted by suitable heating, drying and/or aging, or irradiation of electromagnetic waves such as UV light.

In the present invention, the first and second adhesive layers are separately prepared through the above processes and then subjected to lamination, thereby preparing the adhesive film. As needed, one of the adhesive layers is formed first, and then the other adhesive layer is formed directly thereon, thereby producing the adhesive film.

Moreover, suitable corona treatment may be conducted while forming the adhesive layers, if needed, wherein the corona treatment may be carried out with any known instrument generally used in the art.

Figure 4:
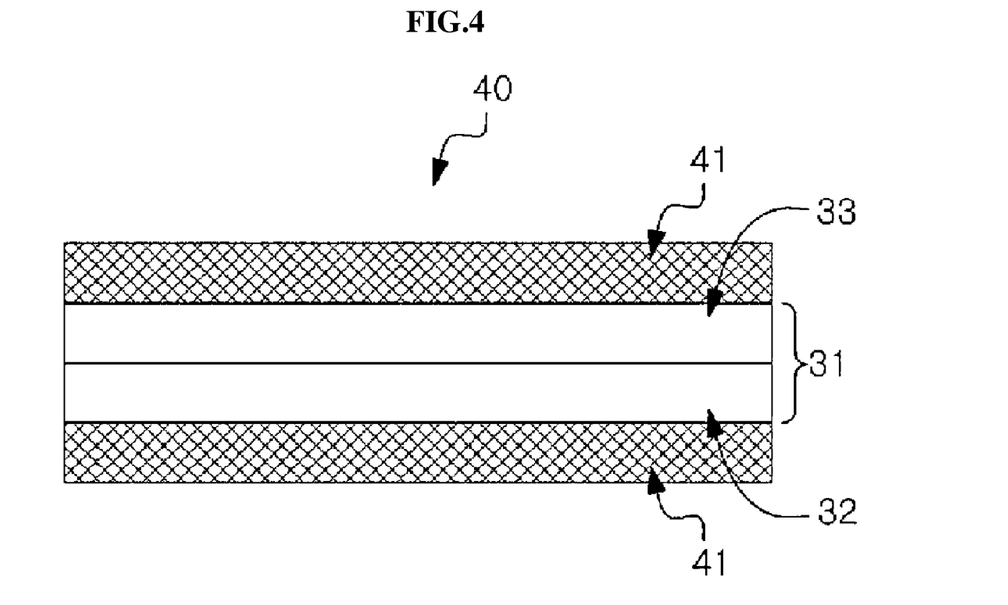
FIG. 4 is a side-sectional view of an adhesive film according to another embodiment of the present invention.

The adhesive film according to the present invention may further include a release film formed on one surface of the first or second adhesive layer, as needed. FIG. 4 is a side-sectional view of an adhesive film according to another embodiment of the present invention. As shown in FIG. 4, the adhesive film may include release films 41 each attached to a first surface of a first adhesive layer 32 and a first surface of a second adhesive layer 33.

However, the adhesive film of FIG. 4 is provided only as an illustrative example. As needed, the adhesive film may have a structure in which a release film is attached to either the first surface of the adhesive layer 32 or the first surface of the second adhesive layer 33.

There is no particular restriction as to the kind of release films available in the present invention, and typical plastic films in the art may be used. Examples of the release film may include polyethylene terephthalate (PET), polytetrafluoroethylene, polyethylene, polypropylene, polybutene, polybutadiene, vinyl chloride copolymer, polyurethane, ethylene-vinyl acetate, ethylene-propylene copolymer, ethylene-ethyl acetate copolymer, ethylene-methyl acetate copolymer, or polyimide films. Further, one or both sides of the release film may undergo suitable release treatment. Examples of a release agent used for release treatment may include alkyd, silicone, fluorine, unsaturated ester, polyolefin, or wax release agents. Among these, alkyd, silicone, and fluorine release agents may be used in view of heat resistance, without being limited thereto.

The thickness of the release film is not particularly limited but may be adjusted suitably depending on purposes. For example, the release film has a thickness of 20 to 100 μm, preferably 30 to 70 μm.

The present invention also relates to a touch panel which includes a conductive plastic film having a conductive layer formed on one surface thereof; and the adhesive film of the present invention attached to the conductive layer of the conductive plastic film, wherein the first surface of the first adhesive layer of the adhesive film is attached to the conductive layer.

The touch panel to which the adhesive film of the present invention is applied may be, for example, a capacitive touch panel. In addition, any general touch panel in the art may be employed so long as the adhesive film of the present invention is applied to the touch panel, without being particularly limited as to a structure or forming method.

Figure 5:
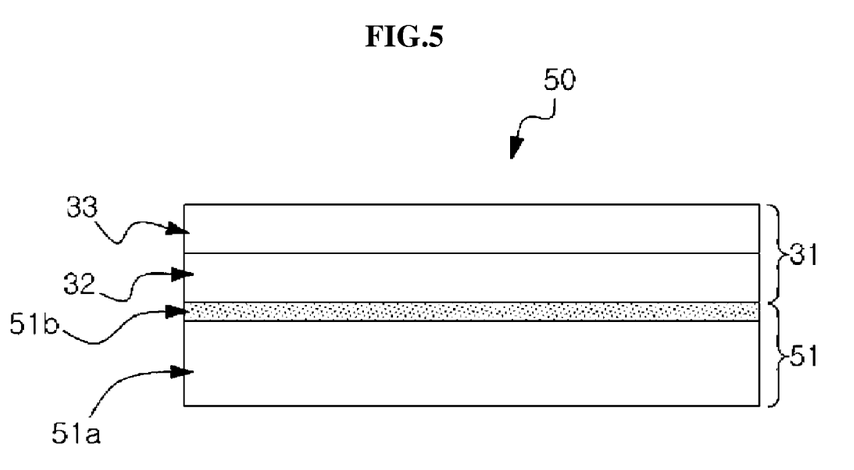
FIG. 5 shows a touch panel according to an embodiment of the present invention.
Figure 6:
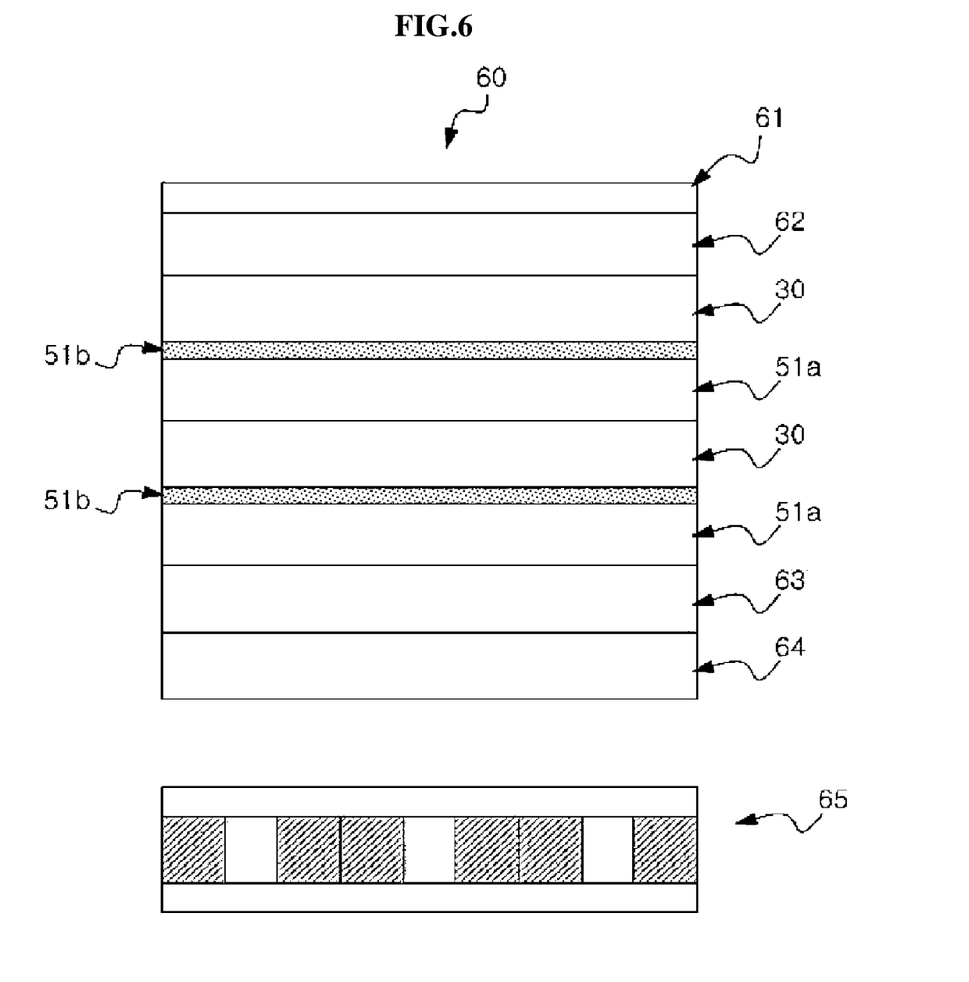
FIG. 6 shows a touch panel according to another embodiment of the present invention.

FIGS. 5 and 6 illustrate touch panels 50 and 60 according to embodiments of the present invention.

As shown in FIG. 5, the touch panel 50 according to one embodiment of the present invention includes a conductive plastic film 51 which includes a plastic base 51a and a conductive layer 51b formed on one surface of the base 51a; and the adhesive film 31 including the first adhesive layer 32 and the second adhesive layer 33 according to the present invention, wherein the adhesive film 31 is attached to the film 51. In this case, the first adhesive layer 32 of the adhesive film 31 is attached to the conductive layer 51b.

In the present invention, there is no particular restriction as to the kind of conductive plastic film, and any conductive film known in the art may be used. In one embodiment, the conductive film may be a transparent plastic film having an indium tin oxide (ITO) electrode layer formed on one surface thereof. Examples of the transparent plastic film may include PET, polytetrafluoroethylene, polyethylene, polypropylene, polybutene, polybutadiene, vinyl chloride copolymer, polyurethane, ethylene-vinyl acetate, ethylene-propylene copolymer, ethylene-ethyl acetate copolymer, ethylene-methyl acetate copolymer, or polyimide films. Among these films, a PET film may be used, without being limited thereto.

FIG. 6 is a touch panel according to another embodiment of the present invention. As shown in FIG. 6, the touch panel 60 according to the present invention includes a hard coating 61, a transparent plastic film 62, an adhesive film 30, a plastic film 51a having a conductive layer 51b formed on one surface thereof, an adhesive film 30, a plastic film 51a having a conductive layer 51b formed on one surface thereof, an adhesive layer 63, and a transparent plastic substrate 64 from the top. The touch panel 60 including the layers may be attached to a display device such as a liquid crystal display (LCD) 65. In the structure shown in FIG. 6, the adhesive film 30 of the present invention may be attached to the conductive layer 51b of the conductive plastic film.

In the structure shown in FIG. 6, there is no particular restriction as to kinds and forming methods of other elements than the adhesive film of the present invention, and general components in the art may be employed, without being particularly limited.

EXAMPLES

Hereinafter, the present invention will be explained in more detail with reference to examples according to the present invention and comparative examples. These examples are provided for illustrative purposes only and are not to be in any way construed as limiting the present invention.

Preparative Example 1

Preparation of Acrylic Resin (A)

65 parts by weight of ethylhexyl acrylate (EHA), 25 parts by weight of methyl acrylate (MA), and 10 parts by weight of hydroxybutyl acrylate (HBA) were put into a 1 L reactor equipped with a reflux condenser for reflux of nitrogen gas and for easy temperature adjustment, and ethyl acetate (EAc) as a solvent was added thereto. Then, after oxygen was purged from the reactor with nitrogen gas for 1 hour, the mixture was evenly stirred while maintaining temperature at 62° C., followed by addition of 0.03 parts by weight of azobisisobutyronitrile (AIBN) diluted with ethyl acetate to 50% as a reaction initiator. Subsequently, the mixture was reacted for about 8 hours, thereby preparing an acrylic resin (A) having a weight average molecular weight of 1,000,000.

Preparative Example 2

Preparation of Acrylic Resin (B)

An acrylic resin (B) having a weight average molecular weight of 1,000,000 was prepared in the same manner as in Preparative Example 1 except that 90 parts by weight of EHA and 10 parts by weight of acrylic acid (AA) were used.

Example 1

Preparation of First Adhesive Layer 100 parts by weight of a silicone resin (7355, Dow Corning Co.), 1 part by weight of an additive (7429, Dow Corning Co.), and 1 part by weight of benzoyl peroxide were mixed into a silicone adhesive resin composition. The composition was applied to a release-treated surface of a PET film (thickness: 50 μm), release-treated with fluorine, to a thickness of about 5 μm after curing, followed by curing at 150° C. for 3 minutes, thereby preparing a silicone adhesive layer.

Preparation of Second Adhesive Layer 100 parts by weight of the acrylic resin (B), 0.5 parts by weight of a bifunctional isocyanate cross-linker as a multifunctional cross-linker, and 0.3 parts by weight of an epoxy silane coupling agent were mixed into an adhesive composition. The composition was diluted with a solvent to prepare a coating solution. Then, the coating solution was applied to a release-treated surface of a release-treated PET film (thickness: 50 μm) to a thickness of about 50 μm after drying, followed by drying at about 100° C. for 5 minutes. The product was then subjected to aging under suitable conditions, thereby forming an adhesive layer having a thickness of 50 μm.

Preparation of Adhesive Film

The prepared first and second adhesive layers were subjected to lamination at room temperature using a 2 kg roller, thereby producing an adhesive film.

Example 2

Preparation of First Adhesive Layer 100 parts by weight of the acrylic resin (A), 0.5 parts by weight of a bifunctional isocyanate cross-linker as a multifunctional cross-linker, and 0.3 parts by weight of an epoxy silane coupling agent were mixed into an adhesive composition. The composition was diluted with a solvent to prepare a coating solution. Then, the coating solution was applied to a release-treated surface of a release-treated PET film (thickness: 50 μm) to a thickness of about 5 μm after drying, followed by drying at about 100° C. for 5 minutes. The product was then subjected to aging under suitable conditions, thereby forming an adhesive layer having a thickness of 5 μm.

Preparation of Second Adhesive Layer and Adhesive Film

A second adhesive layer was formed in the same manner as in Example 1, and an adhesive film was formed in the same manner as in Example 1.

Comparative Example 1

100 parts by weight of the acrylic resin (B), 0.5 parts by weight of a bifunctional isocyanate cross-linker as a multifunctional cross-linker, and 0.3 parts by weight of an epoxy silane coupling agent were mixed into an adhesive composition. The composition was diluted with a solvent to prepare a coating solution. Then, the coating solution was applied to a release-treated surface of a release-treated PET film (thickness: 50 μm) to a thickness of about 55 μm after drying, followed by drying at about 100° C. for 5 minutes. The product was then subjected to aging under suitable conditions, thereby forming an adhesive layer having a thickness of 55 μm. Subsequently, a release-treated PET film (thickness: 50 μm) was stacked on the formed adhesive layer, thereby producing an adhesive film.

Physical properties of the adhesive films prepared in the examples and the comparative example were evaluated as follows.

1. Measurement of Heat Resistance

After removing a release film from each of the adhesive films prepared in Examples 1 and 2, the first adhesive layer side was attached to an ITO side of a PET film having an ITO layer formed on one side thereof (ITO PET) and the opposite second adhesive layer side was attached to a polymethyl methacrylate (PMMA) film, thereby preparing a sample. For the comparative example, after removing a release film, one side was attached to an ITO side of the ITO PET, and the opposite side was attached to a PMMA film, thereby preparing a sample. Then, the samples were left in an oven at 80° C. for 10 days and then observed as to whether bubbles, peeling, separation, or curling occurred, followed by evaluation of heat resistance based on the following criteria.

<Evaluation of Heat Resistance>

O: Bubbles, peeling, separation, and curls not observed

X: Bubbles, peeling, separation, and curls occurred substantially

2. Measurement of Resistance Increase Rate

A resistance increase rate was measured with samples prepared as shown in FIGS. 1 and 2. Specifically, each of the adhesive films prepared in the examples and the comparative examples was cut into a 4 cm×3 cm (width×length) piece, which was attached to an ITO side of a 5 cm×3 cm (width×length) conductive film having an ITO layer formed on one surface thereof and 1 cm-wide silver electrodes formed on opposite edges. Here, the adhesive films of Examples 1 and 2 were disposed such that the first adhesive layer was attached to the ITO side. Further, as shown in FIGS. 1 and 2, each of the adhesive films was disposed to cover half of each silver electrode formed on the ITO side.

Immediately after manufacture of the samples, initial resistance of the ITO ($R_i$) was measured using a 3324 Card HiTester (HIOKI Co.). Then, the samples were left in a thermo-hygrostat (60° C. and 90% RH) for 10 days, followed by measuring resistance of the ITO ($R_1$) using the same device.

Then, measured resistance values are applied to Equation 1 to calculate ΔR.

The results of the evaluation of physical properties are listed in Table 1.

TABLE 1

| Property | Example | | Comparative Example |
| --- | --- | --- | --- |
| | 1 | 2 | 1 |
| Heat resistance | O | O | O |
| Resistance increase rate of ITO (%) | 108 | 110 | 180 |

As seen from Table 1, the adhesive films according to the examples of the present invention not only exhibit excellent heat resistance but remarkably suppress an increase in resistance of the ITO.

However, the adhesive film according to the comparative example secures heat resistance but has a resistance increase rate of 180%, which may cause damage or defects when actually applied to products.

The invention claimed is:

1. A touch panel, comprising:
a first conductive plastic film;
a second conductive plastic film,
wherein each of the first conductive plastic film and second conductive plastic film comprises a polyethylene terephthalate film having an indium tin oxide (ITO) layer formed on one side thereof;
an adhesive film disposed between the first conductive plastic film and the second conductive plastic film,
wherein the adhesive film comprises:
a first adhesive layer having a first surface and a second surface, the first surface of the first adhesive layer of the adhesive film is attached to the ITO layer of the first conductive plastic film; and
a second adhesive layer having a first surface and a second surface,
wherein the first adhesive layer satisfies Equation 1:

$$\Delta R = \frac{R_l - R_i}{R_i} \times 100 < 20,$$

where ΔR a resistance variation rate, $R_i$ is an initial resistance of the ITO layer in a sample prepared by cutting the adhesive film into a 4×3 cm size, and $R_l$ is resistance of the ITO layer measured after the sample was left at 60° C. and 90% RH for 10 days,
wherein the first adhesive layer comprises a cured product of an adhesive composition including a first acrylic resin, the first acrylic resin is free of a carboxylic group,
wherein the first acrylic resin comprises a polymer of a monomer mixture including a (meth)acrylic acid ester monomer and a cross-linking monomer,
wherein the (meth)acrylic acid ester monomer comprises an alkyl (meth)acrylate having a C4 to C16 alkyl group,
wherein the cross-linking monomer comprises a hydroxyl group containing monomer, and
wherein the second surface of the first adhesive layer is directly attached to the second surface of the second adhesive layer, and the first adhesive layer and the second adhesive layer comprise different materials,
wherein the first adhesive layer has a thickness of 1 μm to 50 μm,
wherein the second adhesive layer has a thickness of 10 μm to 250 μm,
wherein the first acrylic resin is prepared by putting 65 parts by weight of ethylhexyl acrylate (EHA), 25 parts by weight of methyl acrylate (MA), and 10 parts by weight of hydroxybutyl acrylate (HBA) into a first 1 L reactor equipped with a reflux condenser, adding ethyl acetate (EAc) as a solvent, stirring, after oxygen was purged from the reactor with nitrogen gas for 1 hour, the mixture while maintaining temperature at 62° C., adding 0.03 parts by weight of azobisisobutyronitrile (AIBN) diluted with ethyl acetate to 50% as a reaction initiator, and reacting the mixture for about 8 hours, and wherein the second adhesive layer comprises a second acrylic resin which is prepared by putting 90 parts by weight of ethylhexyl acrylate (EHA) and 10 parts by weight acrylic acid (AA) into the first 1 L reactor or a second 1 L reactor equipped with a reflux condenser, adding ethyl acetate (EAc) as a solvent, stirring, after oxygen was purged from the reactor with nitrogen gas for 1 hour, the mixture while maintaining temperature at 62° C., adding 0.03 parts by weight of azobisisobutyronitrile (AIBN) diluted with ethyl acetate to 50% as a reaction initiator, and reacting the mixture for about 8 hours.

2. The touch panel of claim 1, wherein the cured product of the adhesive composition includes a multifunctional cross-linker.

3. The touch panel of claim 1, further comprising:
a third adhesive layer having a first surface and a second surface, the first surface of the third adhesive layer of the additional adhesive film is attached to the ITO layer of the second conductive plastic film; and
a fourth adhesive layer having a first surface and a second surface,
wherein the second surface of the third adhesive layer is directly attached to the second surface of the fourth adhesive layer, the third adhesive layer and the fourth adhesive layer comprise different materials.

4. The touch panel of claim 1, wherein the first adhesive layer further includes a silane coupling agent.

5. The touch panel of claim 4, wherein the silane coupling agent includes one or a mixture of more than one selected from the group consisting of γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltrimethoxysilane, γ-aminopropyltriethoxysilane, 3-isocyanatopropyltriethoxysilane, and γ-acetoacetatetripropyltrimethoxysilane.

6. The touch panel of claim 4, wherein the silane coupling agent is included in the first adhesive layer in an amount of 0.005 to 5% by weight based on 100% by weight of the acrylic resin.

* * * * *